(12) United States Patent
Suzuki

(10) Patent No.: US 8,190,886 B2
(45) Date of Patent: May 29, 2012

(54) REVOCATION INFORMATION TRANSMISSION METHOD, RECEPTION METHOD, AND DEVICE THEREOF

(75) Inventor: Hidekazu Suzuki, Nara (JP)

(73) Assignee: Panasonic Corporation, Osaka (JP)

( * ) Notice: Subject to any disclaimer, the term of this patent is extended or adjusted under 35 U.S.C. 154(b) by 1155 days.

(21) Appl. No.: 10/549,423

(22) PCT Filed: Mar. 25, 2004

(86) PCT No.: PCT/JP2004/004138
§ 371 (c)(1),
(2), (4) Date: Sep. 15, 2005

(87) PCT Pub. No.: WO2004/086235
PCT Pub. Date: Oct. 7, 2004

(65) Prior Publication Data
US 2006/0171391 A1 Aug. 3, 2006

(30) Foreign Application Priority Data
Mar. 26, 2003 (JP) .................................. 2003-085043

(51) Int. Cl.
*H04L 29/06* (2006.01)
(52) U.S. Cl. ....................................................... 713/158
(58) Field of Classification Search .................... 713/158
See application file for complete search history.

(56) References Cited

U.S. PATENT DOCUMENTS

| | | | | |
|---|---|---|---|---|
| 5,692,124 A | * | 11/1997 | Holden et al. ..................... | 726/2 |
| 6,275,941 B1 | * | 8/2001 | Saito et al. ......................... | 726/2 |
| 6,748,531 B1 | * | 6/2004 | Epstein .......................... | 713/158 |
| 7,225,164 B1 | * | 5/2007 | Candelore et al. ............... | 705/57 |
| 2002/0004901 A1 | * | 1/2002 | Yip et al. ........................ | 713/156 |
| 2002/0007346 A1 | * | 1/2002 | Qiu et al. .......................... | 705/50 |
| 2002/0147686 A1 | | 10/2002 | Safadi et al. | |
| 2004/0054892 A1 | * | 3/2004 | Ji et al. ........................... | 713/164 |
| 2006/0020784 A1 | * | 1/2006 | Jonker et al. ................... | 713/157 |

FOREIGN PATENT DOCUMENTS

| | | |
|---|---|---|
| EP | 0 930 556 A2 | 7/1999 |
| EP | 930556 A2 * | 7/1999 |
| EP | 04 72 3337 | 9/2011 |
| JP | 11-205305 | 7/1999 |

(Continued)

OTHER PUBLICATIONS

ISO/IEC, International Standard 13818-1: Information technology—Generic coding of moving pictures and associated audio information: Syatems, Dec. 1, 2000, ISO/IEC, All Pages.*

(Continued)

*Primary Examiner* — Michael S McNally
(74) *Attorney, Agent, or Firm* — RatnerPrestia

(57) ABSTRACT

The invention provides a revocation information transmission method, revocation information reception method, revocation information transmitting apparatus, and revocation information receiving apparatus, wherein all the video output apparatuses such as STB may have a revocation list in common, and it is possible to exclude unjust display and to improve the security of the digital interface for connecting a video output apparatus to a display. The revocation information transmission method comprises at least a step of preparing integrated revocation information by integrating the revocation information of the contents transmitting equipment or contents receiving equipment, a step of packetizing the integrated revocation list and multiplexing it into a stream, and a step of transmitting the stream.

12 Claims, 17 Drawing Sheets

FOREIGN PATENT DOCUMENTS

| | | |
|---|---|---|
| JP | 2000-148592 A | 5/2000 |
| JP | 2000-261472 | 9/2000 |
| JP | 2001-166996 | 6/2001 |
| WO | WO 01/61591 A1 | 8/2001 |

OTHER PUBLICATIONS

Supervised by Hiroshi Fujiwara, Hiroshi Yasuda, edited by Multi Media Tsushin Kenkyukai, "Point Zukaishiki Broadband + Mobile Hyojun MPEG Kyokasho", Ascii Corp., Feb. 11, 2003, pp. 317 to 320.

International Search Report corresponding to International Application No. PCT/JP2004/004138 dated Jul. 6, 2004.

* cited by examiner

| Maker ID | Apparatus ID | Bksv |
|---|---|---|
| Maker_1 | Kiki_1 | Bksv_1 |
| Maker_2 | Kiki_2 | Bksv_2 |
| Not registered | Not registered | Not registered |
| Not registered | Not registered | Not registered |

| Maker ID | Apparatus ID | Bksv |
|---|---|---|
| Maker_1 | Kiki_1 | Bksv_1 |
| Maker_2 | Kiki_2 | Bksv_2 |
| Maker_3 | Kiki_3 | Bksv_3 |
| Not registered | Not registered | Not registered |

FIG. 11

| Field | No. of bits |
|---|---|
| sync_byte | 8 |
| transport_stream_indicatior | 1 |
| payload_unit_start_indicator | 1 |
| transport_priority | 1 |
| PID | 13 |
| transport_scrambling_control | 2 |
| adaptation_field_control | 2 |
| continuity_counter | 4 |
| for (i=0;i <n;i++){ | |
|     data_byte | 8 |
| } | |

FIG. 12

| Field | No. of bits |
|---|---|
| table_id | 8 |
| section_syntax_indicatior | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| for (i=0; i <n;i++){ | |
|     marker_id | 16 |
|     kiki_id | 32 |
|     device_KSV | 40 |
| } | |
| CRC_32 | 32 |

FIG. 13

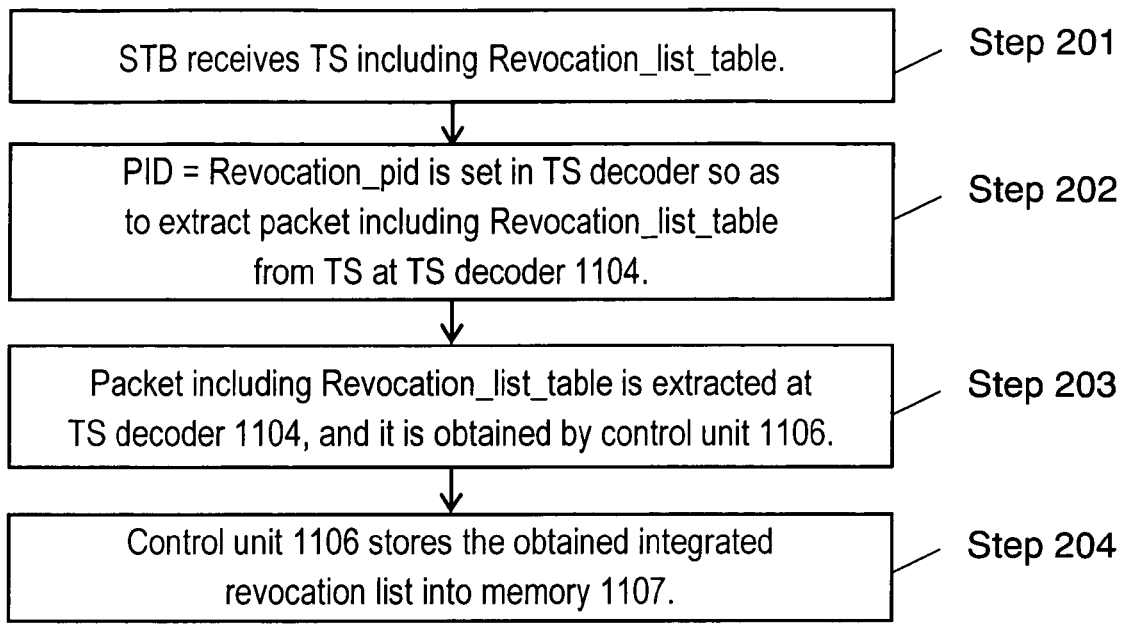

STB receives TS including Revocation_list_table. — Step 201

PID = Revocation_pid is set in TS decoder so as to extract packet including Revocation_list_table from TS at TS decoder 1104. — Step 202

Packet including Revocation_list_table is extracted at TS decoder 1104, and it is obtained by control unit 1106. — Step 203

Control unit 1106 stores the obtained integrated revocation list into memory 1107. — Step 204

FIG. 14

| Maker ID | Apparatus ID | Bksv |
|---|---|---|
| Maker_1 | Kiki_1 | Bksv_1 |
| Maker_2 | Kiki_2 | Bksv_2 |
| Maker_3 | Kiki_3 | Bksv_3 |
| Maker_4 | Kiki_4 | Bksv_4 |
| Maker_5 | Kiki_5 | Bksv_5 |
| Not registered | Not registered | Not registered |
| Not registered | Not registered | Not registered |

FIG. 15

| Bksv |
|---|
| Bksv_1 |
| Bksv_2 |
| Not registered |
| Not registered |

FIG. 16

| Bksv |
|---|
| Bksv_1 |
| Bksv_2 |
| Bksv_3 |
| Not registered |

FIG. 17

| Field | No. of bits |
|---|---|
| table_id | 8 |
| section_syntax_indicatior | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| for (i=0; i <n;i++){ | |
|     device_KSV | 40 |
| } | |
| CRC_32 | 32 |

| Bksv |
| --- |
| Bksv_1 |
| Bksv_2 |
| Bksv_3 |
| Bksv_4 |
| Bksv_5 |
| Not registered |
| Not registered |

| Field | No. of bits |
| --- | --- |
| packet_start_code_prefix | 24 |
| strem_id | 8 |
| PES_packet_length | 16 |
| for (i=0;i <PES_packet_length/5;i++){ | |
|     maker_id | 16 |
|     kiki_id | 32 |
|     device_KSV | 40 |
| } | |

FIG. 20

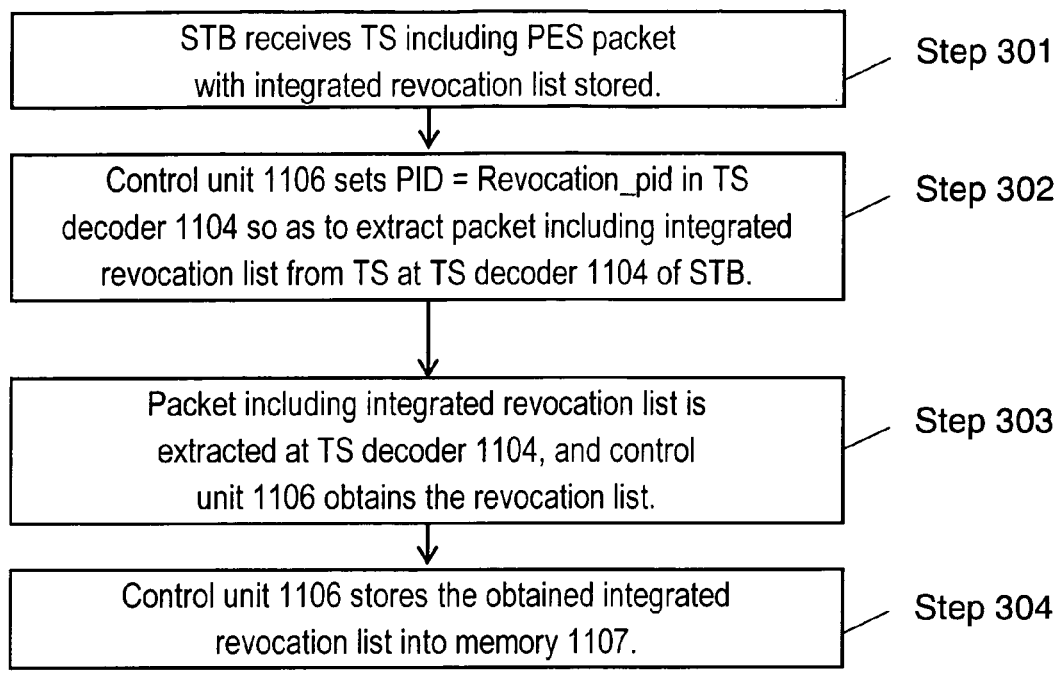

Step 301: STB receives TS including PES packet with integrated revocation list stored.

Step 302: Control unit 1106 sets PID = Revocation_pid in TS decoder 1104 so as to extract packet including integrated revocation list from TS at TS decoder 1104 of STB.

Step 303: Packet including integrated revocation list is extracted at TS decoder 1104, and control unit 1106 obtains the revocation list.

Step 304: Control unit 1106 stores the obtained integrated revocation list into memory 1107.

FIG. 21

| Field | No. of bits |
|---|---|
| packet_start_code_prefix | 24 |
| strem_id | 8 |
| PES_packet_length | 16 |
| for (i=0;i <PES_packet_length/5;i++){ | |
|     device_KSV | 40 |
| } | |

FIG. 22

| Field | No. of bits |
|---|---|
| KSV_number | 16 |
| For (I=0;I <KSV_number,I++){ | |
|     maker_id | 16 |
|     kiki_id | 32 |
|     device_KSV | 40 |
| } | |

| Field | No. of bits |
|---|---|
| KSV_number | 16 |
| For (I=0;I <KSV_number,I++){<br>    device_KSV<br>} | 40 |

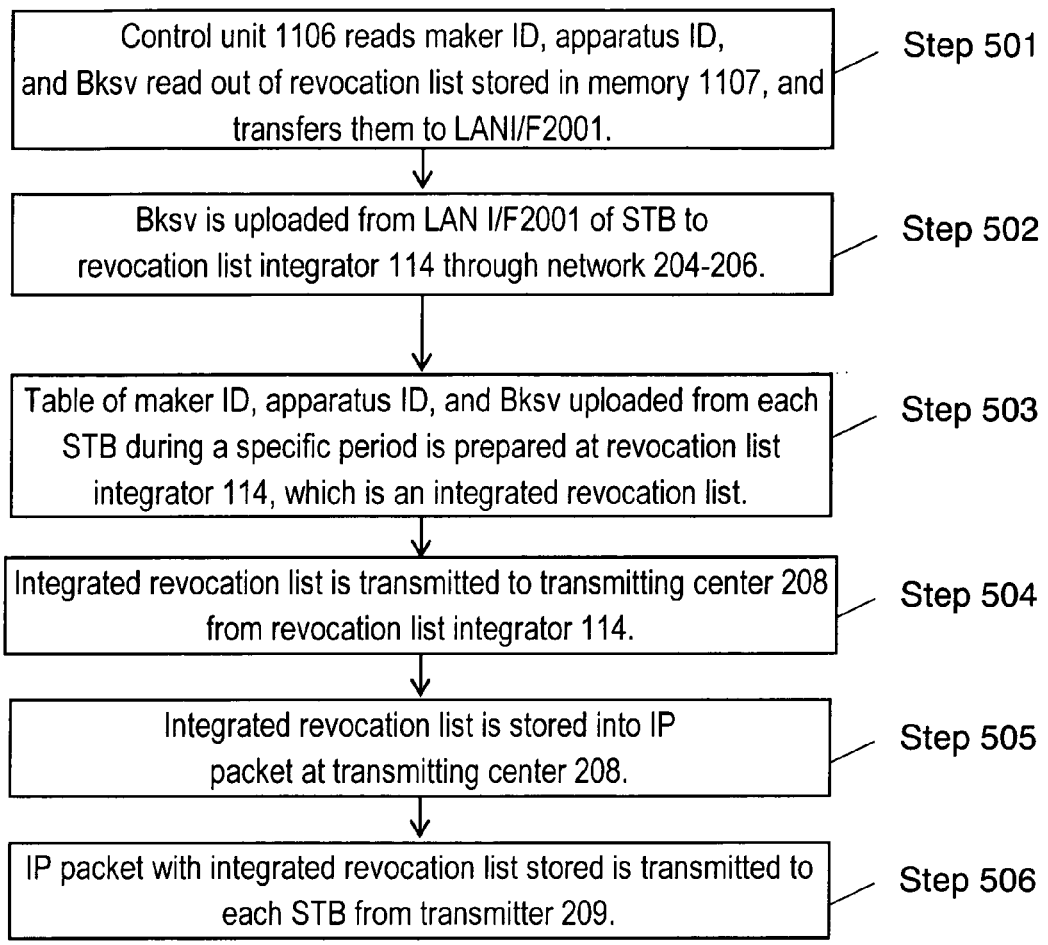

REVOCATION INFORMATION TRANSMISSION METHOD, RECEPTION METHOD, AND DEVICE THEREOF

This Application is A U.S. National Phase Application of PCT International Application PCT/JP2004/004138.

TECHNICAL FIELD

The present invention relates to a revocation information transmission method and apparatus for preventing digital pictures or digital voices from being displayed or reproduced by unjust electronic apparatuses.

BACKGROUND ART

As digital technology has been greatly developed in recent years, digital broadcast, digital contents distribution by Internet, digital contents distribution and accumulation by DVD, hard disc and memory card are becoming very popular. Since digital data are used in these media, it is possible to copy the data without deterioration in quality. However, it is important to realize security for preventing such unjust copying from the viewpoint of copyright protection. For realizing the security, revocation information that is a so-called black list of unjust apparatuses has to be issued when the apparatus is found to be an unjust apparatus from the viewpoint of copyright protection. And, it is necessary for the apparatus which can be connected to an unjust apparatus to have the revocation information and to prevent unfair access to digital contents.

FIG. 31 is an example of conventional system for renewing of revocation information, and the configuration of the system is shown in FIG. 25. Such a configuration is disclosed in Japanese Laid-Open Patent 2001-166996.

Contents sales system 3001 is an automatic vending machine which electronically distributes musical contents via a transmission network such as broadcast and Internet. Electric music distributor (EMD in FIG. 31, and also, EMD in later description) 3002 is a music server or music broadcasting station. Revocation information issuing authority 3003 issues revocation information. Revocation information storage section 3005 receives revocation information issued by revocation information issuing authority 3003. Music data storage section 3006 stores music data. License storage section 3007 stores a key for decoding coded contents. EMD I/F 3008 is an interface for receiving coded contents. PD I/F 3009 is an interface for connection to playback device (PD) 3012. Media I/F 3010 is a card slot of PCMCIA for mounting recording media 3014. Recording media 3014 is a portable media (PM). Playback device 3012 comprises recording media 3013. User I/F 3011 is an interface to be operated by user. Security contents server 3004 is a server, and the information is delivered and received between EMD I/F 3008, revocation information storage section 3005, music data storage section 3006, license storage section 3007, media I/F 3010, user I/F 3011, and PD I/F 3009.

DISCLOSURE OF THE INVENTION

A revocation information transmission method comprises the steps of:
executing mutual authentication between a contents transmitting equipment and a contents receiving equipment;
uploading revocation information including key information of mutual authentication failure from the contents transmitting equipment or the contents receiving equipment in case of mutual authentication failure;
preparing integrated revocation information by integrating individual revocation information uploaded;
packetizing the integrated revocation information and multiplexing it into a stream; and
transmitting the stream,
wherein the revocation information transmission method is used in a system comprising a contents transmitting equipment for transmitting contents, a contents receiving equipment for receiving contents, and a connecting means for connecting the contents transmitting equipment to the contents receiving equipment.

A revocation information transmission method comprises the steps of:
integrating revocation information of one or multiple contents transmitting equipments or content receiving equipments to make integrated revocation information;
packetizing the integrated revocation information and multiplexing it into a stream; and
transmitting the stream.

A revocation information reception method comprises the steps of:
receiving an integrated revocation information list by a contents transmitting equipment or a contents receiving equipment; and
storing the integrated revocation list by the contents transmitting equipment or the contents receiving equipment.

A revocation information transmitting apparatus comprises:
a plurality of contents transmitting equipments for transmitting contents;
a plurality of contents receiving equipments for receiving contents, which are respectively connected to the plurality of contents transmitting equipments;
a connecting means for connecting the contents transmitting equipment to the contents receiving equipment;
a network for sucking up revocation information from the plurality of contents transmitting equipments or the plurality of contents receiving equipments;
an integrating means for integrating revocation information, which is connected to the network;
a multiplexing means for packetizing the integrated revocation information integrated at the integrating means and multiplexing it into a stream; and
a transmitting means for transmitting the stream.

A revocation information transmitting apparatus comprises:
an integrating means for integrating revocation information of one or multiple contents transmitting equipments or contents receiving equipments;
a multiplexing means for packetizing the integrated revocation information and multiplexing it into a stream; and
a transmitting means for transmitting the stream.

A revocation information receiving apparatus comprises:
a contents transmitting equipment or contents receiving equipment which receives an integrated revocation list,
wherein the contents transmitting equipment or the contents receiving equipment stores the integrated revocation list.

BRIEF DESCRIPTION OF THE DRAWINGS

FIG. 11 shows the data structure of a transport packet.

FIG. 12 shows the data structure when an integrated revocation list is stored in a section structure.

FIG. 13 shows a flow of receiving an integrated revocation list in the preferred embodiment 1.

FIG. 14 shows an example of integrated revocation list jointly owned by each STB.

FIG. 15 shows an example of revocation list of STB.

FIG. 16 shows an example of revocation list renewed.

FIG. 17 shows an example of data structure when an integrated revocation list is stored in a section structure.

FIG. 20 shows a flow of receiving an integrated revocation list in the preferred embodiment 2.

FIG. 21 shows an example of data structure when an integrated revocation list is stored in a PES packet.

FIG. 22 shows an example of data structure when an integrated revocation list is stored in a payload of transport packet.

FIG. 27 shows a flow ranging from uploading of revocation list to transmitting of integrated revocation list in the preferred embodiment 4.

FIG. 28 shows a data structure of IP packet.

DETAILED DESCRIPTION OF THE PREFERRED EMBODIMENT

In the above description of a conventional example, a renewing method for revocation information is mentioned, but there is no description of a specific method for transmitting revocation information. Therefore, a method of transmitting revocation information is needed as digital broadcast or Internet is becoming very popular as a contents transmission method.

Preferred Embodiment 1

The preferred embodiment 1 of the present invention will be described in the following with reference to the drawings.

Figure 1:
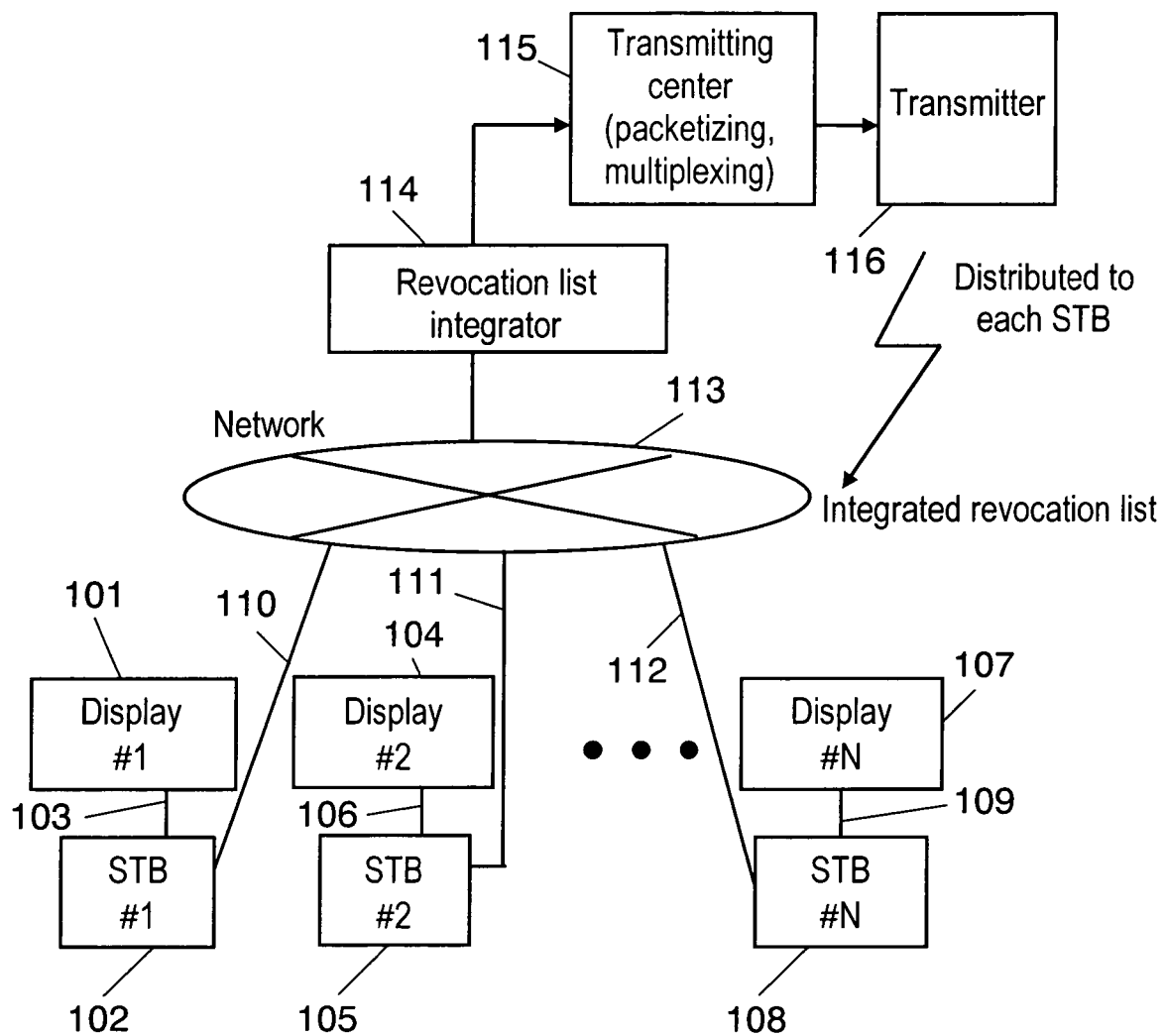
FIG. 1 shows a system which realizes the revocation list transmission method and reception method in the preferred embodiments 1 to 3.

FIG. 1 shows a system configuration for realizing the revocation information transmission and reception methods in the present invention. First display 101 (display #1 in FIG. 1) is a CRT, liquid crystal display or plasma display, which displays pictures. First display 101 is sometimes provided with a speaker for outputting voice signals.

Figure 2:
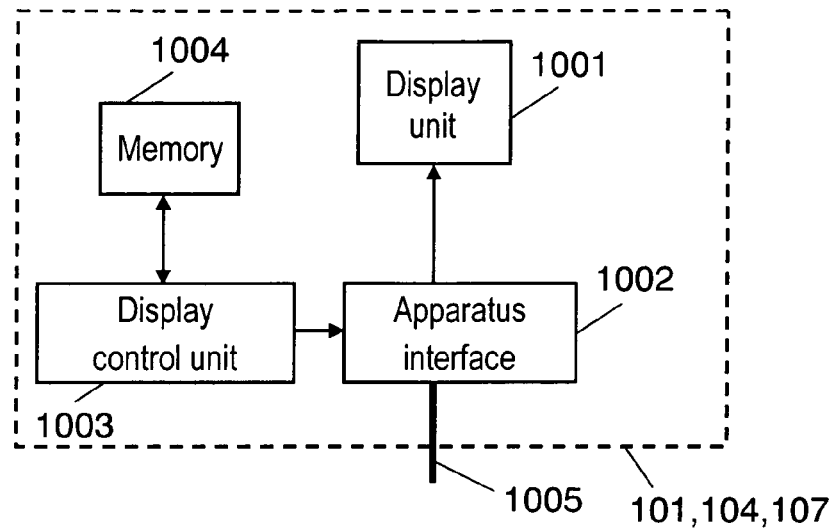
FIG. 2 shows the internal configuration of a display.

FIG. 2 shows an internal configuration of first display 101. Display unit 1001 displays pictures. Apparatus interface 1002 is for connection to STB described later. Display control unit 1003 serves to control the whole display. Memory 1004 stores maker ID, apparatus ID and key information of the display described later.

First STB (STB #1 in FIG. 1, and STB stands for a set top box) 102 receives, decodes and reproduces digital pictures, voices, and other data transmitted or broadcast. Described here is STB for receiving digital broadcast.

Figure 3:
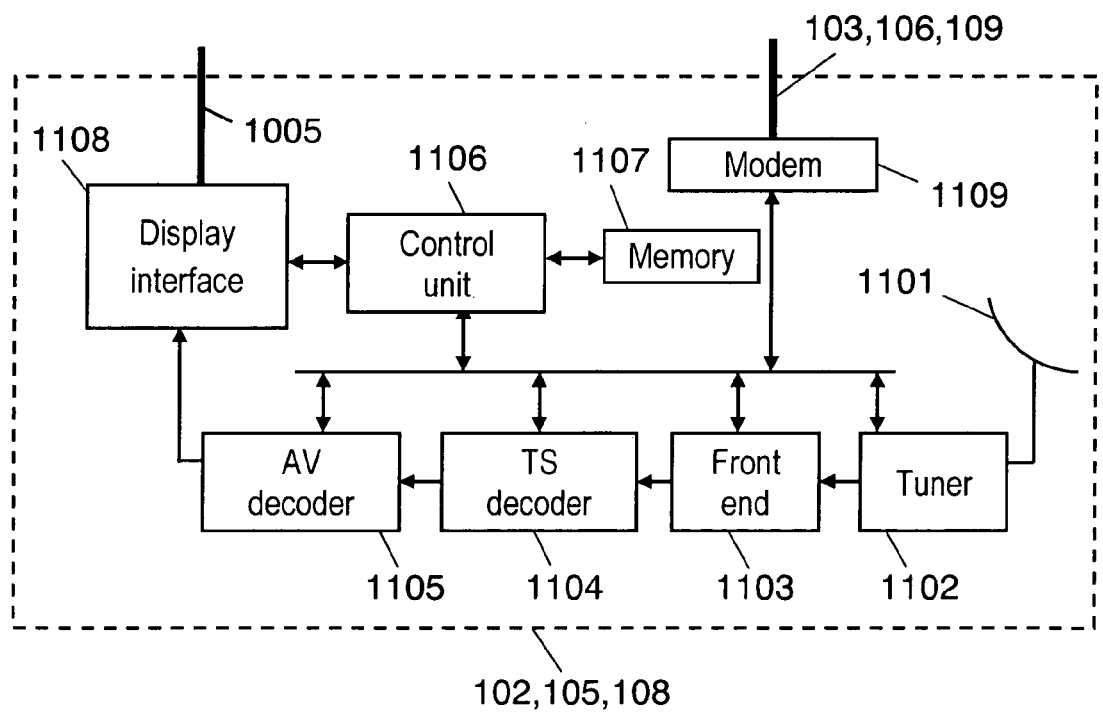
FIG. 3 shows the internal configuration of STB in the preferred embodiments 1 to 3.

FIG. 3 shows an internal configuration of the STB. Antenna 1101 receives digital broadcasting waves. Tuner 1102 demodulates broadcasting waves. Front end 1103 corrects errors with respect to demodulated signals and reproduces TS (transport stream). TS decoder 1104 extracts user-selected program packets (picture, voice, data, etc.) from TS multiplexed with a plurality of programs. AV decoder 1105 elongates the picture packet and voice packet extracted by TS decoder 1104, and outputs the digital picture signal and voice signal. Control unit 1106 serves to control the whole STB. Memory 1107 stores revocation list and STB key information described later. Display interface 1108 outputs pictures and voices to the display or exchanges key information. Modem 1109 communicates with network 113 described later.

Digital interface 103 is a digital interface which connects first display 101 to first STB 102, and an example mentioned here is HDMI (High-Definition Multi-media Interface). Second display 104 (display #2 in FIG. 1) is same as first display 101. Second STB (STB #2 in the figure) 105 is same as first STB 102. Second digital interface 106 is a digital interface which connects second display 104 to second STB 105, which is same as first digital interface 103.

Nth display (N is a natural number, display #N in FIG. 1) 107 is same as first display 101. Nth STB (STB #N in FIG. 1) 108 is same as first STB 102. Nth digital interface 109 is same as first digital interface 103.

First up-line 110 connects first STB 102 to a network described later. This is a medium for transmitting the revocation list accumulated in STB to the network. The revocation list will be described later. The up-line is a copper wire, optical cable or the like.

Second up-line 111 is same as first up-line 110. Nth up-line 112 is same as first up-line 110. Portions provided with reference numerals 101 to 112 are those available at each home or individually put into available form at each home. Also, the Nth value is not limited.

Network 113 is a medium for sucking up the revocation list from STB at each home into revocation list integrator 114, which is for example a telephone network or Internet. Revocation list integrator 114 integrates the revocation list sucked up from each STB in order to prepare and control the integrated revocation list that is a table of revocation lists. Transmitting sensor 115 packets the integrated revocation list and multiplexes it into a transport stream for broadcast. Transmitter 116 transmits the information and the like to each STB. Transmitter 116 is for example provided with a transmitting antenna.

As for the preferred embodiment 1 having the above configuration, the operation is described in the following. In HMDI is used a decoding system that is called HDCP (High-Bandwidth Digital Content Protection) for contents protection. HDCP prescribes the decoding method for digital contents that flow between a transmitting apparatus such as an STB, DVD player, and DVD recorder for transmitting pictures and voices and a receiving apparatus such as a display for displaying pictures. The detail is mentioned in the standard for HDCP, High-Bandwidth Digital Content Protection System, and the description is omitted.

Figure 4:
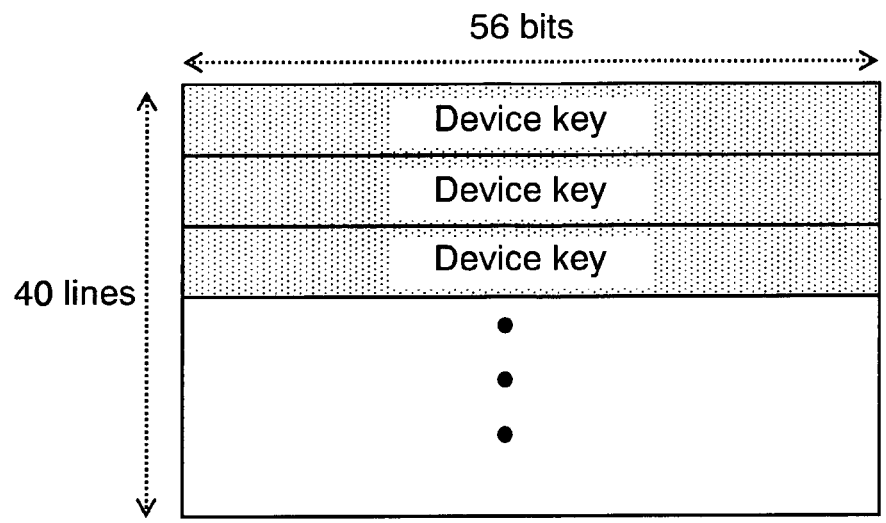
FIG. 4 shows a matrix of device keys.

First display 101 to Nth display 107 have maker ID, apparatus ID, and a matrix of device keys for display of 56 bits×40 lines in each memory 1004. It is shown in FIG. 4. Also, key selection vector (hereinafter called KSV) for specifying the line of each device key is assigned corresponding to the matrix of device keys, which is stored in memory 1004. Hereinafter, KSV for display is referred to as Bksv.

Also, first STB 102 to Nth STB 108 have device keys and KSV for STB in each memory 1107. Hereinafter, KSV for STB is referred to as Aksv.

The device key and key selection vector are controlled by LLC that is the control organization of HDCP, and are given to apparatuses such as each display, STB and DVD.

Figure 5:
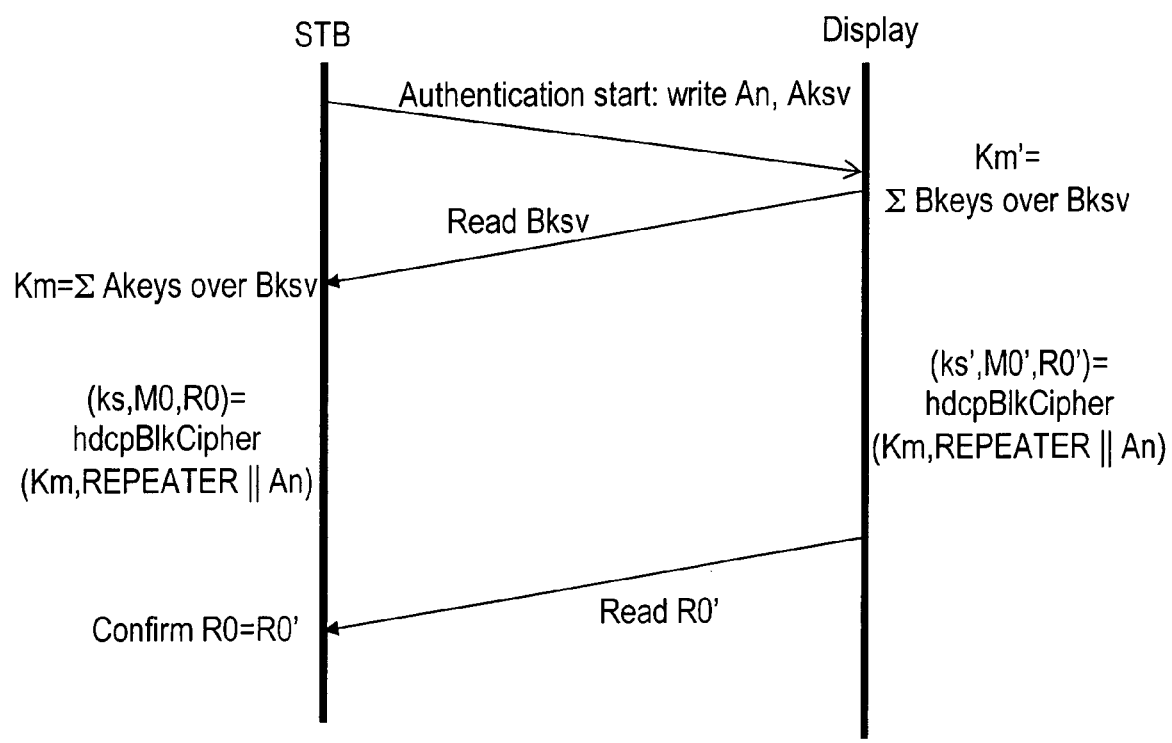
FIG. 5 shows a process of initial authentication.
Figures 6, 7, 8:
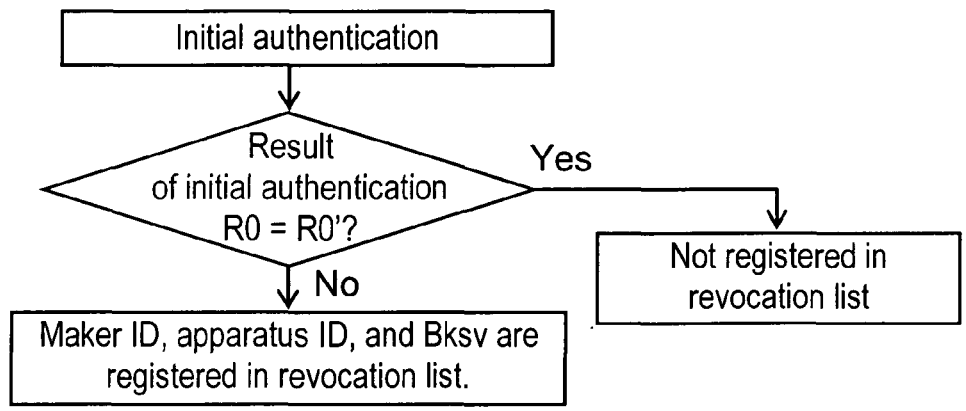
FIG. 6 shows an example of revocation list of STB.
FIG. 7 shows a flow for preparing the revocation list of STB.
FIG. 8 shows an example of revocation list renewed.

A method of preparing a revocation list at STB will be described in the following. As an example, first STB 102 and first display 101 are described. FIG. 5 shows a process for initial authentication of STB and display. The process is described in detail in the document High-Bandwidth Digital Content Protection System mentioned earlier, and the description is omitted. FIG. 6 shows an example of revocation list of memory 1107 of first STB 102. In the list are stored maker ID, apparatus ID, and Bksv of the display to be excluded as an unjust apparatus from the viewpoint of copyright protection. In the example of FIG. 6, two displays are registered as apparatuses to be excluded. Maker ID is for identification of the maker. Apparatus ID is for identification of the apparatus, which is for example a serial number of the apparatus.

Initial authentication will be described in the following. Firstly, first STB 102 and first display 101 are connected to each other by first digital interface 103, or first STB 102 and first display 101 are supplied with power.

Next, first STB 102 reads maker ID, apparatus ID, and Bksv out of first display 101 via first digital interface 103. In this case, it is preferable to use I2C line that is the control line of first digital interface 103.

In case the maker ID, apparatus ID, and Bksv then read out are same as those of the revocation list of first STB 102, it is initial authentication failure, and the display will be unusable thereafter.

Next, random number An of 64 bits, and Aksv are written into first display 101 from first STB 102 via first digital interface 103.

It is also preferable to use I2C line.

Next, first STB 102 reads Bksv out of first display 101, and executes the following calculation (formula 1) at first STB 102.

$$Km = \Sigma A\text{keys over } Bksv \quad \text{(formula 1)}$$

The calculation of (formula 1) will be described. Akeys is a matrix of STB's device keys of 56 bits×40 lines, which is stored in memory 1107 of STB. For example, Bksv being "2B8" in a sexadecimal expression, and the initial bit position being No. 0, then bit positions 3, 4, 5, 7, 9 are "1", and other bit positions are "0".

And, in (formula 1), bit positions 3, 4, 5, 7, 9 where "1" of Bksv exists are the indexes of lines, and five 56-bit keys are added.

In first display 101, the calculation of (formula 2) is similarly executed.

$$Km' = \Sigma B\text{keys over } Aksv \quad \text{(formula 2)}$$

Bkeys is a matrix of display's device keys of 56 bits×40 lines, which is stored in memory 1004 of the display.

Next, first STB 102 executes the calculation of (formula 3) on the basis of Km to obtain Ks, M0, R0.

$$(Ks, M0, R0) = hdcpBlk\text{Cipher}(Km, \text{REPEATER} \| An) \quad \text{(formula 3)}$$

In (formula 3), REPEATER is "1" when the relevant apparatus performs the repeat function, that is, re-transmitting function, and it is "0" in the other cases. Here, it is supposed that the display performs no repeat function, and REPEATER is "0". Also, in (formula 3), ∥ shows bit linkage. The operator called hdcpBlkCipher used in (formula 3) is described in detail in Chapter 4.5 of the document High-Bandwidth Digital Content Protection System, and the description is omitted.

On the other hand, the calculation of (formula 4) is similarly executed in first display 101.

$$(Ks', M0', R0') = hdcpBlk\text{Cipher}(Km', \text{REPEATER} \| An) \quad \text{(formula 4)}$$

Next, a determining process is executed on the initial authentication, and it is shown in FIG. 7. STB reads R0' out of the display, and determines whether R0=R0' or not. In case R0 is coincident with R0', the initial authentication is successful. On the other hand, in case R0 is not coincident with R0', it is regarded as a failure of initial authentication, and first STB 102 regards the display's Bksv to be unjust and registers it in the revocation list of memory 1107. In that case, the STB stores the maker ID and apparatus ID together. FIG. 8 shows the detail of memory 1107. In FIG. 8, maker_3, kiki_3, Bksv_3 are apparatuses registered as unjust apparatuses.

The above initial authentication processing is described in detail in the document High-Bandwidth Digital Content Protection System, and the description is omitted. Second STB 105 to Nth STB 108, second display 104 to Nth display 107 also execute similar initial authentication processing same as in first STB 102 and first display 101, and if Bksv is found to be unjust, it will be registered in the revocation list of the memory of STB connected thereto.

Figure 9:
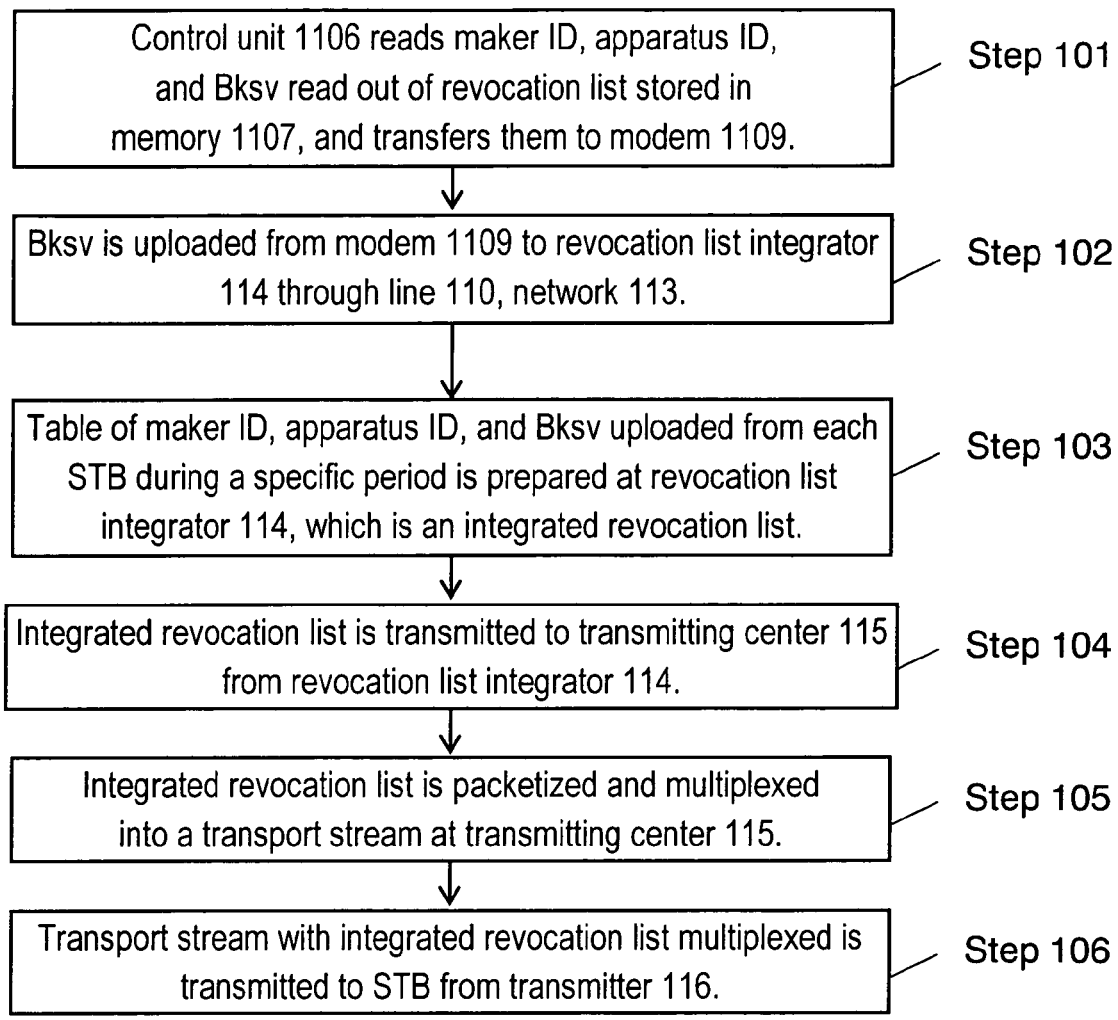
FIG. 9 shows a flow ranging from uploading of revocation list to transmitting of integrated revocation list in the preferred embodiments 1 to 3.

A method of integrating the revocation list registered in STB and transmitting it to each STB will be described in the following. FIG. 9 shows a flow ranging from uploading to transmitting of revocation list.

In step 101, control unit 1106 of STB reads maker ID, apparatus ID, and Bksv out of the revocation list stored in memory 1107, and transfers them to modem 1109.

In step 102,

Bksv is uploaded from modem 1109 of STB to revocation list integrator 114 via up-line 110 and network 113.

In step 103, a list of Bksv uploaded from each STB during a predetermined period is prepared at revocation list integrator 114, which is an integrated revocation list.

In step 104, the integrated revocation list is transmitted from revocation list integrator 114 to transmitting sensor 115.

In step 105, transmitting sensor 115 packets the integrated revocation list and multiplexes it into a transport stream.

In step 106, transmitter 116 transmits the transport stream with the integrated revocation list multiplexed to each STB.

Figure 10:
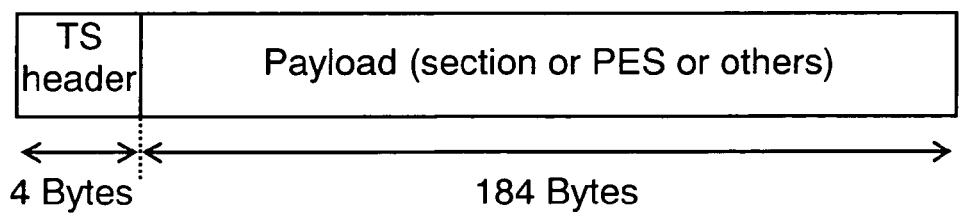
FIG. 10 schematically shows the data structure of a transport packet.

Packetizing and multiplexing of revocation list in step 105 will be described in detail in the following. FIG. 10 schematically shows a transport packet, and FIG. 11 shows a data structure of the transport packet. The data structure of transport packet is described in the MPEG system standard, ISO/IEC13818-1, and the description is omitted.

Integrated revocation list is stored in the data_byte portion of transport packet, that is, the payload portion in FIG. 10, to which a certain PID is assigned. The PID is for example Revocation_pid. In the preferred embodiment 1, integrated revocation list is stored in a section structure conforming to MPEG system standard. FIG. 12 shows an example of data structure when integrated revocation list is stored in a section structure. The table of integrated revocation lists is for example called Revocation_list_table, but it is of course preferable to be any other name. In this data structure, maker_id (16 bits) and kiki_id (32 bits) and device_KSV (40 bits) are the maker ID and apparatus ID sucked up from STB, and each unjust Bksv. The number of bits is not specified for maker ID and apparatus ID.

A method of receiving an integrated revocation list at each STB will be described in the following. FIG. 13 shows a flow of receiving an integrated revocation list at STB.

In step 201,

STB receives TS (transport stream) including Revocation_list_table.

In step 202, control unit 1106 sets the Revocation_pid to the PID filter of TS decoder 1104 so as to extract a packet including Revocation_list_table from TS at TS decoder 1104 of STB. PID filter is an essential function of TS decoder, which serves to extract a packet having specified PID.

In step 203,

TS decoder 1104 extracts a packet including Revocation_list_table, and control unit 1106 obtains an integrated revocation list.

In step 204, control unit 1106 stores the obtained integrated revocation list into memory 1107.

FIG. 14 shows the integrated revocation list stored in memory 1107. In this way, it becomes possible for all STB to have an integrated revocation list in common.

And, when a new display is connected to STB, the operation will be executed in the following manner. In case the maker ID, apparatus ID, and Bksv read out of a display are identical with those in the revocation list stored in the memory of STB, the initial authentication is a failure, and the display will become unusable thereafter.

In the above description, mentioned as an example of information included in the revocation list is such a case that the maker ID, apparatus ID, and Bksv of the apparatus to be excluded as an unjust apparatus are included. However, in the present invention, the maker ID, apparatus ID, and Bksv of the apparatus to be excluded as an unjust apparatus are not always necessary to be included in all the revocation lists. For example, a system in which only Bksv of the apparatus to be excluded as an unjust apparatus is included in the revocation list is also preferable.

Figures 18, 19:
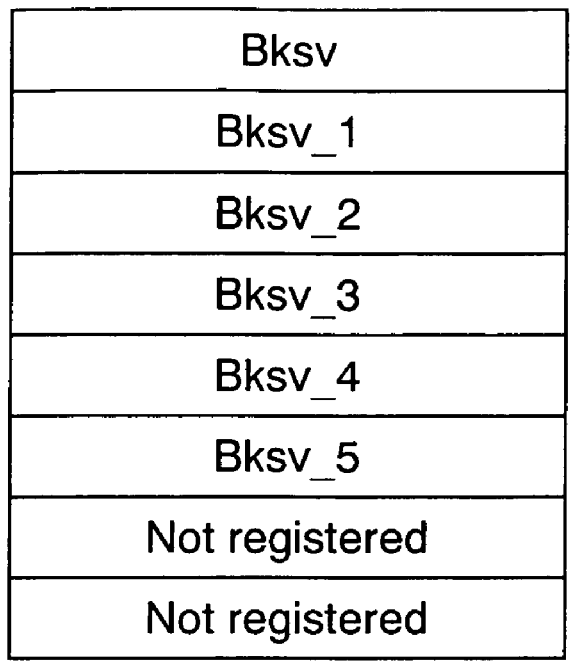
FIG. 18 shows an example of integrated revocation list jointly owned by each STB.
FIG. 19 shows a data structure when an integrated revocation list is stored in a PES packet structure.

FIG. 15 to FIG. 18 are intended to explain such a case that only Bksv of the apparatus to be excluded as an unjust apparatus is included in the revocation list. FIG. 15 corresponds to a case that only Bksv is included in the revocation list in FIG. 6. FIG. 16 corresponds to a case that only Bksv is included in the revocation list in FIG. 8. FIG. 17 corresponds to a case that only Bksv is included in the revocation list in FIG. 12. FIG. 18 corresponds to a case that only Bksv is included in the revocation list in FIG. 14. The difference of FIG. 15 from FIG. 6, the difference of FIG. 16 from FIG. 8, the difference of FIG. 17 from FIG. 12, and the difference of FIG. 18 from FIG. 14 are that only Bksv of the apparatus to be excluded as an unjust apparatus is included in the revocation list. Accordingly, the further description of FIG. 15 to FIG. 18 is omitted.

In each flow ranging from uploading of revocation list to transmitting of integrated revocation list, the maker ID and apparatus ID in FIG. 7 and FIG. 9 are not included.

As described above, in the preferred embodiment 1, in case of failure in the initial authentication process of STB and display, the apparatus is regarded as an unjust apparatus, and the maker ID, apparatus ID and KSV of the apparatus are stored in the memory of STB to prepare a revocation list. The revocation list is uploaded from each STB to the revocation list integrator through a network. The revocation list integrator integrates the revocation lists uploaded from each STB. After that, it is packeted to a section and is multiplexed to TS, and the multiplexed TS is transmitted from the transmitter. STB receives the TS transmitted from the transmitter and obtains the integrated revocation list, and thereby, it becomes possible for all STB to jointly have a revocation list individually owned by each STB. Thus, it is possible to improve the security, excluding an unjust display from the viewpoint of copyright protection.

Preferred Embodiment 2

The preferred embodiment 2 of the present invention will be described in the following. The packetizing method for integrated revocation list is different from that in the preferred embodiment 1. FIG. 19 shows a data structure of a packet including an integrated revocation list in the preferred embodiment 2. In the preferred embodiment 2, the integrated revocation list is stored in the PES packet of the MPEG system standard shown in FIG. 10.

FIG. 20 shows a flow of receiving an integrated revocation list in the preferred embodiment 2.

In step 301,

STB receives TS including the PES packet in which the integrated revocation list is stored.

In step 302, control unit 1106 sets Revocation_pid to the PID filter of TS decoder 1104 so as to extract the packet including the integrated revocation list from TS at TS decoder 1104 of STB.

In step 303,

TS decoder 1104 extracts the packet including the integrated revocation list, and control unit 1106 obtains the integrated revocation list.

In step 304, control unit 1106 stores the obtained integrated revocation list into memory 1107. Thus, it becomes possible for all STB to have an integrated revocation list in common.

As described above, in the preferred embodiment 2, in case of failure in the initial authentication process of STB and display, the apparatus is regarded as an unjust apparatus, and the maker ID, apparatus ID and KSV of the apparatus are stored in the memory of STB to prepare a revocation list. The revocation list is uploaded from each STB to the revocation list integrator through a network. The revocation list integrator integrates the revocation lists uploaded from each STB. After that, the revocation list is packetized to a PES packet and is multiplexed to TS. The multiplexed TS is transmitted from the transmitter. STB receives the TS transmitted from the transmitter and obtains the integrated revocation list, and thereby, it becomes possible for all STB to jointly have a revocation list individually owned by each STB. Thus, it is possible to improve the security, excluding an unjust display from the viewpoint of copyright protection.

In the above description, mentioned as an example of information included in the revocation list is such a case that the maker ID, apparatus ID, and Bksv of the apparatus to be excluded as an unjust apparatus are included. However, in the present invention, the maker ID, apparatus ID, and Bksv of the apparatus to be excluded as an unjust apparatus are not always necessary to be included in all the revocation lists. For example, a system in which only Bksv of the apparatus to be excluded as an unjust apparatus is included in the revocation list is also preferable.

Also, the difference of FIG. 21 from FIG. 19 is that only Bksv of the apparatus to be excluded as an unjust apparatus is included in the revocation list. Accordingly, the further description of FIG. 21 is omitted.

Preferred Embodiment 3

The preferred embodiment 3 of the present invention will be described in the following. The packetizing method for integrated revocation list is different from that of the preferred embodiment 1. FIG. 22 shows a data structure of a packet including an integrated revocation list in the preferred embodiment 3. In the preferred embodiment 3, as shown in FIG. 22, the integrated revocation list is stored in the payload of TS packet of the MPEG system standard instead of taking a data structure such as PES packet and section.

Figures 23, 24:
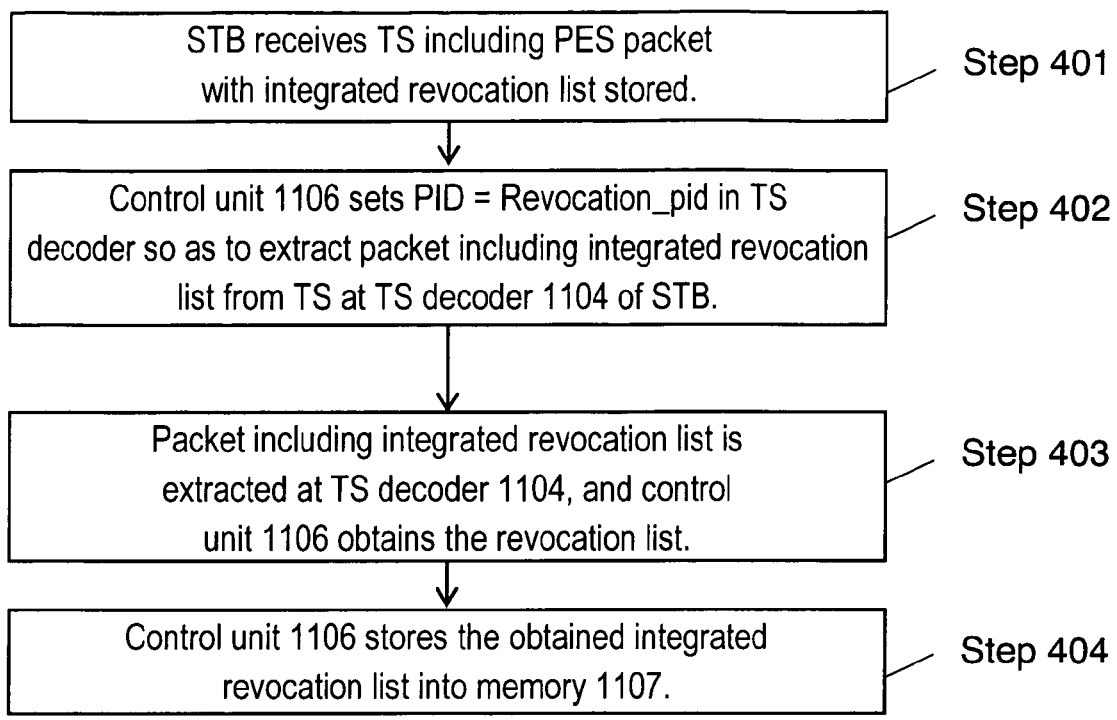
FIG. 23 shows a flow of receiving an integrated revocation list in the preferred embodiment 3.
FIG. 24 shows a data structure when an integrated revocation list is stored in a payload of transport packet.

FIG. 23 shows a flow of receiving an integrated revocation list in the preferred embodiment 3.

In step 401,

STB receives TS including the packet in which the integrated revocation list is stored.

In step 402, control unit 1106 sets Revocation_pid to the PID filter of TS decoder 1104 so as to extract the packet including the integrated revocation list from TS at TS decoder 1104 of STB.

In step 403,

TS decoder 1104 extracts the packet including the integrated revocation list, and control unit 1106 obtains the integrated revocation list.

In step 404, control unit 1106 stores the obtained integrated revocation list into memory 1107.

Thus, it becomes possible for all STB to have an integrated revocation list in common.

As described above, in the preferred embodiment 3, in case of failure in the initial authentication process of STB and display, the apparatus is regarded as an unjust apparatus, and the maker ID, apparatus ID and KSV of the apparatus are stored in the memory of STB to prepare a revocation list. And, the revocation list is uploaded from each STB to the revocation list integrator through a network. The revocation list integrator integrates the revocation lists uploaded from each STB. After that, the revocation list is packetized as it is stored into the payload of TS packet, and is multiplexed to TS. The multiplexed TS is transmitted by the transmitter. STB receives the TS transmitted from the transmitter and obtains the integrated revocation list. In this way, it becomes possible for all STB to jointly have a revocation list individually owned by each STB. Thus, it is possible to improve the security, excluding an unjust display from the viewpoint of copyright protection.

As already described, in the present invention, the maker ID, apparatus ID, and Bksv of the apparatus to be excluded as an unjust apparatus are not always necessary to be included in all the revocation lists. For example, a system in which only Bksv of the apparatus to be excluded as an unjust apparatus is included in the revocation list is also preferable. FIG. 24 is intended to explain such a case that only Bksv of the apparatus to be excluded as an unjust apparatus is included in the revocation list. The difference of FIG. 24 from FIG. 22 is that only Bksv of the apparatus to be excluded as an unjust apparatus is included in the revocation list. Accordingly, the further description of FIG. 24 is omitted.

Preferred Embodiment 4

Figure 25:
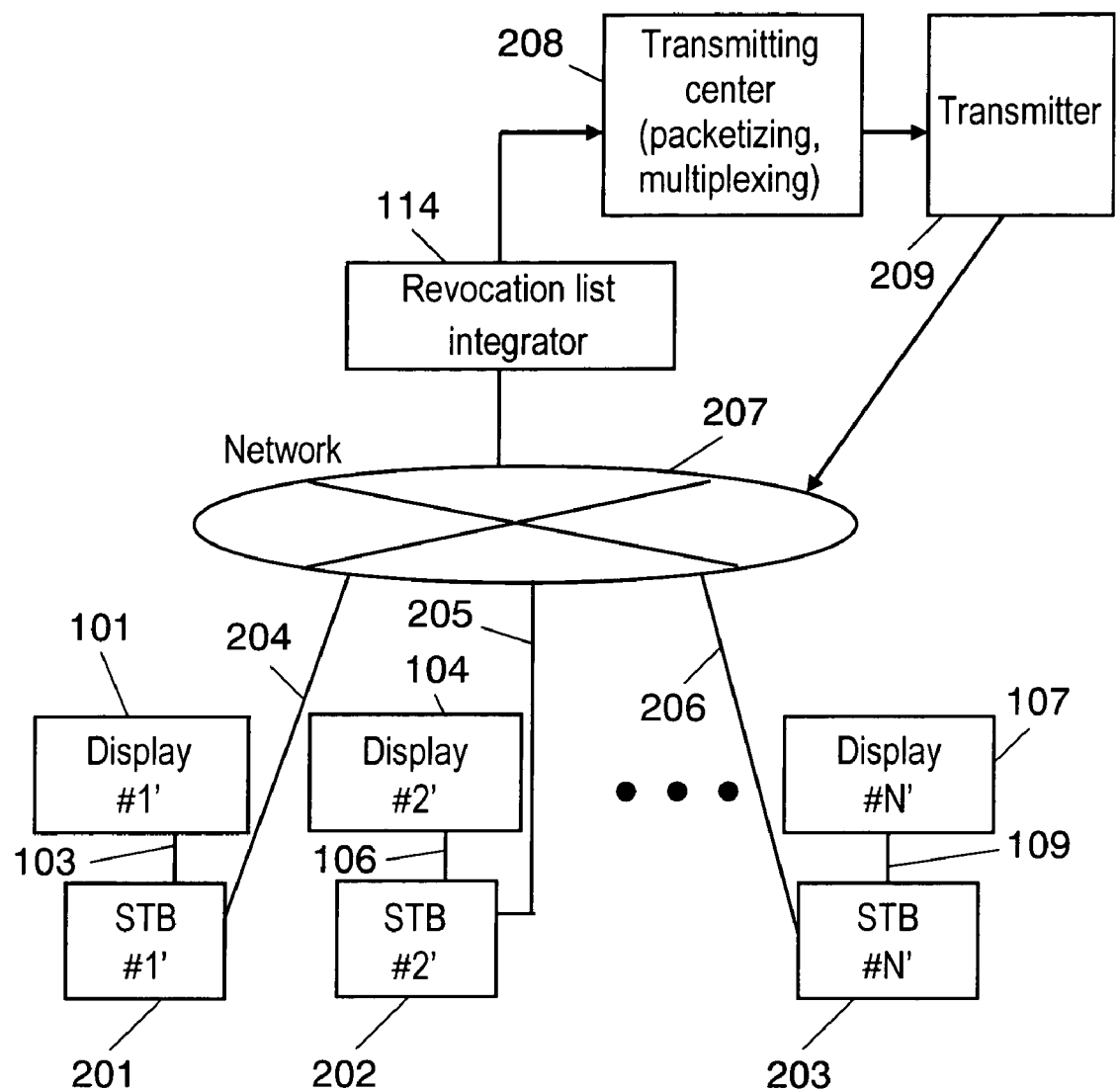
FIG. 25 shows a system device for realizing integrated revocation list transmission and reception methods in the preferred embodiment 4.

The preferred embodiment 4 of the present invention will be described in the following. The difference from the preferred embodiment 1 is that the integrated revocation list is transmitted to each STB through a network instead of digital broadcast. FIG. 25 shows a configuration of a system for realizing the transmission and reception methods for revocation information in the preferred embodiment 4. Only the differences from the preferred embodiment 1 will be described.

STB #1' 201 to STB #N' 203 are STB having an interface to Internet.

Figure 26:
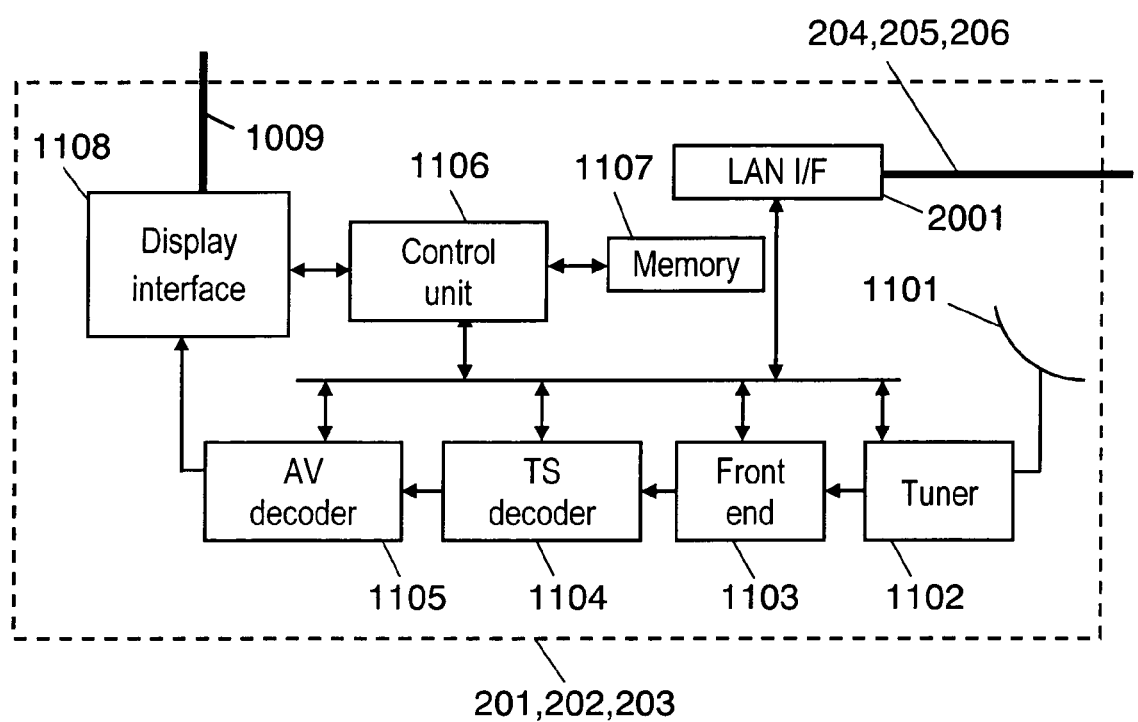
FIG. 26 shows an internal configuration of STB in the preferred embodiment 4.

FIG. 26 shows the internal configuration of STB #1' 201 to STB #N' 203. Only the differences from the STB in the preferred embodiment 1 shown in FIG. 3 will be described. LAN I/F 2001 is connected to a network described later, which is an interface for handling IP packet.

Network 204 to 207 is a network based on Internet. Transmitting center 208 stores an integrated revocation list in IP packet. Transmitter 209 transmits the IP packet in which the integrated revocation list is stored.

The operation of the preferred embodiment 4 having the above configuration will be described in the following. The differences from the preferred embodiment 1 is described.

In the preferred embodiment 4, the operation up to preparation of revocation list by STB #1' 201 to STB #N' 203 is same as in the preferred embodiment 1. FIG. 27 shows a flow ranging from uploading to transmitting of the revocation list.

In step 501, control unit 1106 of STB reads the maker ID, apparatus ID and Bksv out of the revocation list stored in memory 1107 and transfers them to LAN I/F 2001.

In step 502,

Bksv is uploaded from LAN I/F 2001 of STB to revocation list integrator 114 through network 204, network 205, and network 206.

In step 503, revocation list integrator 114 prepares a table of Bksv uploaded from each STB during a predetermined period, and it is an integrated revocation list.

In step 504, the integrated revocation list is transmitted from revocation list integrator 114 to transmitting center 208.

In step 505, transmitting center 208 stores the integrated revocation list into IP packet.

In step 506, transmitter 209 transmits the IP packet storing the integrated revocation list to each STB.

Here, the packetizing of integrated revocation list in step 505 will be described. FIG. 28 schematically shows an example of data structure of IP packet. In the data portion of this packet is stored integrated revocation information similar to that in the preferred embodiment 1.

Figure 29:
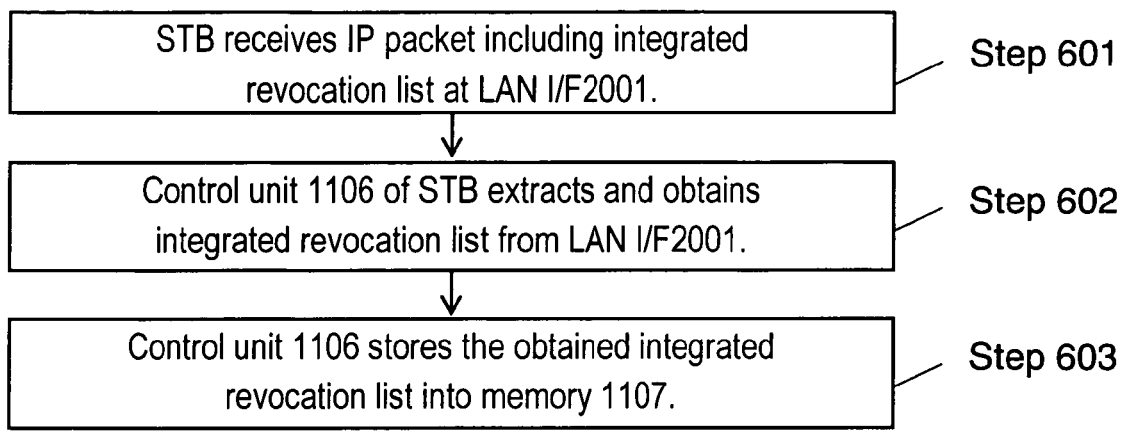
FIG. 29 shows a flow of receiving an integrated revocation list in the preferred embodiment 4.

Next, a method of receiving an integrated revocation list at each STB will be described. FIG. 29 shows a flow of receiving an integrated revocation list at STB.

In step 601,

STB receives IP packet including the integrated revocation list by means of LAN I/F 2001.

In step 602,
control unit 1106 of STB extracts and obtains the integrated revocation list from LAN I/F 2001.

In step 603,
control unit 1106 stores the obtained integrated revocation list into memory 1107.

Thus, it becomes possible for all STB to have an integrated revocation list in common.

And, when a new display is connected to STB, it is checked if the maker ID, apparatus ID and Bksv read out of the display are coincident with the revocation list in the memory of STB. In case some are coincident, it is initial authentication failure, and the display will be unusable thereafter.

As described above, in the preferred embodiment 4, in case of failure in the initial authentication process of STB and display, the apparatus is regarded as an unjust apparatus, and the maker ID, apparatus ID and KSV of the apparatus are stored in the memory of STB to prepare a revocation list. The revocation list is uploaded from each STB to the revocation list integrator through a network. The revocation list integrator integrates the revocation lists uploaded from each STB. After that, the revocation list is packetized into an IP packet and transmitted from the transmitter. STB receives the IP packet transmitted from the transmitter and obtains the integrated revocation list, and thereby, it becomes possible for all STB to jointly have a revocation list individually owned by each STB. Thus, it is possible to improve the security, excluding an unjust display from the viewpoint of copyright protection.

In the above preferred embodiment, mentioned as an example of information included in the revocation list is such a case that the maker ID, apparatus ID, and Bksv of the apparatus to be excluded as an unjust apparatus are included. However, in the present invention, the maker ID, apparatus ID, and Bksv of the apparatus to be excluded as an unjust apparatus are not always necessary to be included in all the revocation lists. For example, a system in which only Bksv of the apparatus to be excluded as an unjust apparatus is included in the revocation list is also preferable.

Preferred Embodiment 5

Figure 30:
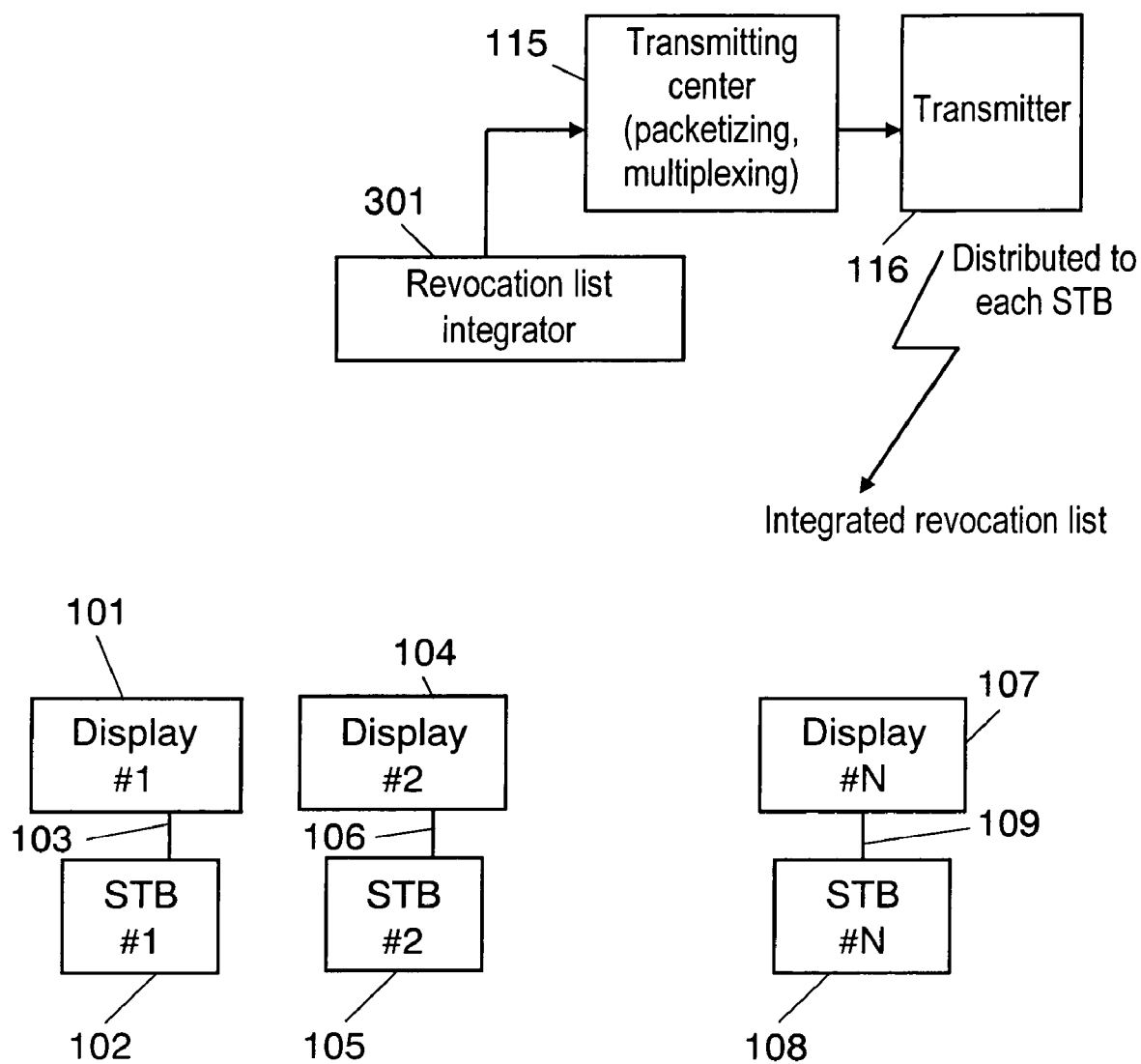
FIG. 30 shows a system device for realizing revocation list transmission and reception methods in the preferred embodiment 5.
Figure 31:
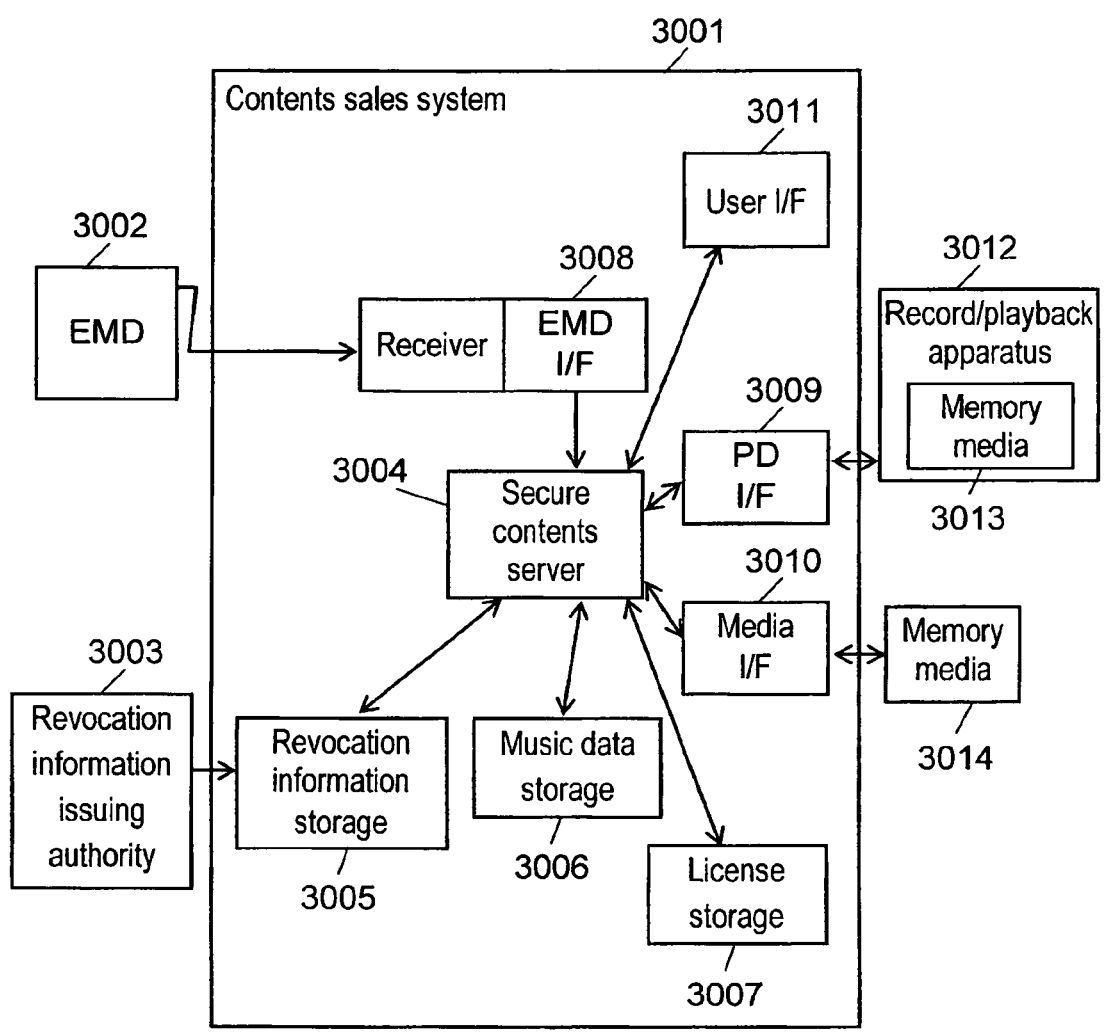
FIG. 31 shows a conventional example.

The preferred embodiment 5 of the present invention will be described in the following. FIG. 30 shows the configuration of a system for realizing the transmission and reception methods for revocation information in the preferred embodiment 5. The difference from the preferred embodiment 1 is that the revocation list is not uploaded from STB, but the integrated revocation list is issued from revocation list integrator 301. In case of failure in the initial authentication of a revocation list, the user directly or indirectly reports the revocation list controlling authority that the apparatus is in doubt of being an unjust apparatus. According to the report, the revocation list controlling authority recollects the apparatus that is in doubt of being an unjust apparatus. Or, the revocation list controlling authority obtains the revocation information of the apparatus that is in doubt of being an unjust apparatus. Here, the revocation information includes Bksv of unjust apparatus. The revocation controlling authority prepares an integrated revocation list including the revocation information by using the revocation information obtained. The integrated revocation list is preferable to be multiplexed into TS as in the preferred embodiments 1 to 3 or to be stored in IP packet as in the preferred embodiment 4. The process after preparing the integrated revocation list is same as in the preferred embodiments 1 to 4.

As described above, in the preferred embodiment 5, the revocation list is not uploaded from STB, but an integrated revocation list is prepared by the revocation list integrator. Transmitting center 115 stores the prepared integrated revocation list in TS or IP packet, and it is transmitted by transmitter 116. STB receives the TS transmitted from transmitter 116 and obtains the integrated revocation list, and thereby, it becomes possible for all STB to jointly have a revocation list individually owned by each STB. Thus, it is possible to improve the security, excluding unjust display from the viewpoint of copyright protection.

In the above description, mentioned as an example is such a case that in case of failure in the initial authentication process, the user reports the revocation list to the revocation list controlling authority. However, the present invention is not limited to such a system that revocation apparatus information is reported by user. That is, a system in which a specific authority reports the information of the revocation apparatus to the revocation list controlling authority is also preferable. Also, it is preferable to adopt a system in which the revocation list controlling authority inspects the revocation apparatus information.

In each of the above preferred embodiments, STB is an example of contents transmitting apparatus in the description, but the contents transmitting apparatus is preferable to be other apparatus such as DVD player, DVD recorder, and PC. Also, as a digital interface, HDMI is mentioned as an example in the description, but it is preferable to be DVI or IEEE1394. Also, in each of the above preferred embodiments, display is an example of contents receiving apparatus in the description, but the contents receiving apparatus is not limited to display. Also, display is preferable to be a repeater such as AV switcher. Also, integrated revocation list is preferable to be stored in something other than TS packet and IP packet before being transmitted. Also, a means for uploading the revocation list is preferable to be a network other than telephone and Internet.

Also, in each of the above preferred embodiments, whether it is an unjust apparatus or not is checked from the viewpoint of copyright protection by collating the apparatus with the integrated revocation list distributed. In the present invention, as a result of collating the apparatus with the integrated revocation list distributed, if it is found to be an unjust apparatus from the viewpoint of copyright protection, it is also possible to avoid outputting video signal or audio signal from the apparatus at the contents transmitting side. In this way, it is possible to further prevent the contents from flowing out to unjust apparatuses from the viewpoint of copyright protection.

Also, in the description of the preferred embodiment 1 to preferred embodiment 3, mentioned is about a system for storing an integrated revocation list into TS packet of the MPEG system standard. The system for storing an integrated revocation list into TS packet in the present invention is not limited to the above-mentioned system. That is, an integrated revocation list is preferable to be multiplexed wherever possible to TS of the MPEG system standard. For example, it is preferable to multiplex an integrated revocation list to adaptation_field, private_section, or portions other than the aforementioned portions of storable descriptor and PES packet having a section structure.

As described above, according to the present invention, since all the video output apparatuses such as STB have a revocation list of unjust display in common from the viewpoint of copyright protection, it is possible to exclude unjust display. Thus, it brings about an advantage such that the security of digital interface for connecting a video output apparatus to a display can be improved.

INDUSTRIAL APPLICABILITY

In the revocation information transmission method, the revocation information reception method, the revocation information transmitting apparatus, and the revocation information receiving apparatus of the present invention, it is possible for all the video output apparatuses such as STB to have a revocation list in common, and it is possible to exclude unjust display. Thus, it brings about an advantage such that the security of digital interface for connecting a video output apparatus to a display can be improved.

REFERENCE NUMERALS IN THE DRAWINGS 101 first display
102 First STB
103 First digital interface
104 Second display
105 Second STB
106 Second digital display
107 Nth display
108 Nth STB
109 Nth digital interface
110 First up-line
111 Second up-line
112 Nth up-line
113 Network
114 Revocation list integrator
115 Transmitting center
116 Transmitters
1001 Display unit
1002 Apparatus interface
1003 Control unit
1004 Memory
1101 Antenna
1102 Tuner
1103 Front end
1104 TS decoder
1105 AV decoder
1106 Control unit
1107 Memory
1108 Display interface
201 First STB
202 Second STB
203 Nth STB
204-207 Network
208 Transmitting center
209 Transmitter
2001 LAN I/F
301 Revocation list integrator

The invention claimed is:

1. A revocation information transmission method used in a system including a plurality of transceiver devices for transmitting and receiving contents through a network, and a plurality of reproduction devices for reproducing the received contents, the method comprising the steps of:
executing, by the transceiver devices, authentication of the plurality of reproduction devices, respectively, where each of the transceiver devices reads authentication information of a respective one of the reproduction devices;
individually uploading, from each of the transceiver devices through the network to a revocation integrator device, revocation information indicating an authentication failure of a respective one of the individual reproduction devices;
integrating, by the revocation integrator device, the revocation information uploaded from each of the transceiver devices as an integrated revocation list representing a common list of revocation information for each of the reproduction devices;
packetizing the integrated revocation list and multiplexing the packetized revocation list into a stream; and
transmitting the stream to the contents transceiver devices on the network;
wherein each transceiver device utilizes, in the common list, other revocation information from other transceiver devices that previously uploaded revocation information to the revocation integrator device to:
a) deny unauthorized reproduction devices from reproducing the content when the unauthorized devices are included in the common list, and
b) allow authorized reproduction devices to reproduce the content when the authorized reproduction devices are not included in the common list.

2. The revocation information transmission method of claim 1, wherein the stream is an MPEG transport stream, and the integrated revocation list is transmitted by using a data structure of a PES packet of the MPEG transport stream.

3. The revocation information transmission method of claim 1, wherein the stream is an MPEG transport stream, and the integrated revocation list is transmitted by using a payload of a transport packet of the MPEG transport stream.

4. The revocation information transmission method of claim 1, wherein the integrated revocation list is transmitted by using an IP packet.

5. The revocation information transmission method of claim 1, wherein:
one of the transceiver devices, as a first transceiver device includes a first digital interface for outputting a compressed/expanded digital signal to a respective one of the reproduction devices, as a first reproduction device and a second digital interface for executing the mutual authentication between the first transceiver device and the first reproduction device, the method further comprising:
receiving the stream by the first transceiver device; and
selectively outputting, via the first digital interface of the first transceiver device, the compressed/expanded digital signal to the first reproduction device responsive to the integrated revocation list received in the stream.

6. A revocation information transmitting system comprising:
a plurality of transceiver devices for transmitting and receiving contents through a network;
a plurality of reproduction devices for reproducing the received contents;
wherein the transceiver devices include:
a first digital interface for outputting a compressed/expanded digital signal to the reproduction devices;
a second digital interface for receiving authentication information from the reproduction devices;
a revocation integrator device on the network for receiving revocation information uploaded from the plurality of transceiver devices indicating an authentication failure of a respective one of the reproduction devices;
the revocation integrator device integrating the revocation information received from the reproduction devices, as an integrated revocation list representing a common list of revocation information for each of the reproduction devices;
a multiplexer that multiplexes the integrated revocation list integrated by the integrator and multiplexes it into a stream; and
a transmitter that transmits the stream,
wherein the stream is an MPEG transport stream, and the integrated revocation list is transmitted by using a data structure of a section of the MPEG transport stream, and
wherein each transceiver device utilizes, in the common list, other revocation information from other transceiver devices that previously uploaded revocation information to the revocation integrator device to:
a) deny unauthorized reproduction devices from reproducing the content when the unauthorized devices are included in the common list, and
b) allow authorized reproduction devices to reproduce the content when the authorized reproduction devices are not included in the common list.

7. The revocation information transmitting apparatus of claim 6, wherein the stream is an MPEG transport stream, and the integrated revocation list is transmitted by using a data structure of a PES packet of the MPEG transport stream.

8. The revocation information transmitting apparatus of claim 6, wherein the stream is an MPEG transport stream, and the integrated revocation list is transmitted by using a payload of a transport packet of the MPEG transport stream.

9. The revocation information transmitting apparatus of claim 6, wherein the integrated revocation list is transmitted by using an IP packet.

10. A revocation information transmission method including a plurality of transceiver devices for transmitting and receiving contents through a network, and a plurality of reproduction devices for reproducing the received contents, the method comprising the steps of:
executing, by the transceiver devices, authentication of the reproduction devices, by reading authentication information of the reproduction devices through a first digital interface;
uploading, by the transceiver devices, to a revocation integrator device, revocation information of an authentication failure of the reproduction devices; and
integrating, by the revocation integrator device, the revocation information uploaded from each of the transceiver devices as an integrated revocation list representing a common list of revocation information for each of the reproduction devices,
wherein the integrated revocation list is transmitted from the revocation integrator to the transceiver devices using a data structure of a section of an MPEG transport stream,
wherein each transceiver device utilizes, in the common list, other revocation information from other transceiver devices that previously uploaded revocation information to the revocation integrator device to:
a) deny unauthorized reproduction devices from reproducing the content when the unauthorized devices are included in the common list, and
b) allow authorized reproduction devices to reproduce the content when the authorized reproduction devices are not included in the common list.

11. A revocation information managing apparatus for use with a plurality of transceiver devices, connected to a network for transmitting and receiving contents between a plurality of reproduction devices for reproducing the received contents, the managing apparatus including:

a first digital interface for outputting a compressed/expanded digital signal from the transceiver devices to the reproduction devices;
a second digital interface for receiving authentication information from the reproduction devices;
an output for uploading, to a revocation integrator device, revocation information of an authentication failure of the reproduction devices; and
a receiver for receiving an integrated revocation list from the revocation integrator device, the integrated revocation list representing a common list of revocation information for each of the reproduction devices,
wherein the integrated revocation list is transmitted from the revocation integrator device to the transceiver devices using a data structure of a section of an MPEG transport stream, and
wherein each transceiver device utilizes, in the common list, other revocation information from other transceiver devices that previously uploaded revocation information to the revocation integrator device to:
a) deny unauthorized reproduction devices from reproducing the content when the unauthorized devices are included in the common list, and
b) allow authorized reproduction devices to reproduce the content when the authorized reproduction devices are not included in the common list.

12. A revocation information transmission method used in a system including a plurality of transceiver devices for transmitting and receiving contents, and a plurality of reproduction devices for reproducing the received contents, the method comprising the steps of:
executing, by the transceiver devices, authentication of the reproduction devices, where each of the transceiver devices reading reads authentication information of a respective one of the reproduction devices;
individually uploading, from each of the transceiver devices through the network to a revocation integrator device, revocation information indicating an authentication failure of a respective one of the reproduction devices;
integrating, by the revocation integrator device, the revocation information from each of the transceiver devices as an integrated revocation list representing a common list of revocation information for each of the reproduction devices;
packetizing the integrated revocation list and multiplexing the packetized revocation list into a stream; and
transmitting the stream to the transceiver devices on the network,
wherein the stream is an MPEG transport stream, and the integrated revocation list is
1) transmitted by using a data structure of a section of the MPEG transport stream,
2) transmitted by using a payload of transport packet of the MPEG transport stream, and
3) transmitted by using an IP packet, and
wherein each transceiver device utilizes, in the common list, other revocation information from other transceiver devices that previously uploaded revocation information to the revocation integrator device to:
a) deny unauthorized reproduction devices from reproducing the content when the unauthorized devices are included in the common list, and
b) allow authorized reproduction devices to reproduce the content when the authorized reproduction devices are not included in the common list.

* * * * *